United States Patent Office 3,846,113
Patented Nov. 5, 1974

3,846,113
HERBICIDE
Adolf Fischer, Mutterstadt, Germany, assignor to Badische Anilin- & Soda-Fabrik Aktiengesellschaft, Ludwigshafen (Rhine), Germany
No Drawing. Original application Mar. 11, 1970, Ser. No. 18,713. Divided and this application July 13, 1972, Ser. No. 271,358
Claims priority, application Germany, Mar. 19, 1969, P 19 13 850.2
Int. Cl. A01n 9/22
U.S. Cl. 71—91                             6 Claims

ABSTRACT OF THE DISCLOSURE

Herbicides containing a substituted benzothiadiazinone dioxide, N-[1- or 2-(3a,4,5,6,7,7a-hexahydro-4,7-methanoindanyl)]-N',N'-dimethylurea and 1-phenyl-4-amino-5-bromopyridazone-(6) as an additional active ingredient, and a process for controlling the growth of unwanted plants with these mixtures.

DETAILED APPLICATION

This application is a division of my copending application Ser. No. 18,713, filed Mar. 11, 1970.

The invention relates to a herbicide containing a substituted benzothiadiazinone dioxide and at least one other active ingredient.

It is known to use

I. 3-isopropyl-2,1,3-benzothiadiazinone-(4)-2,2-dioxide;
II. 1-(α,α-dimethyl-β-acetoxypropionyl)-3-isopropyl - 2,4-dioxodecahydroquinazoline;
III. N-[1- or 2-(3a,4,5,6,7,7a-hexahydro-4,7-methanoindanyl)]-N',N'-dimethylurea; and
IV. 1-phenyl-4-amino-5-bromopyridazone-(6)

for controlling the growth of unwanted plants; however, their action is not satisfactory.

We have now found that mixtures comprising (a) a compound having the formula

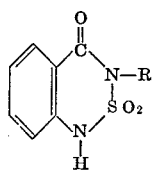

R denoting an isopropyl, ethyl or methyl radical or their salts (potassium, sodium or ammonium salts), and
(b) the compound having the formula

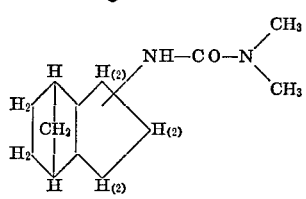

and
(c) the compound having the formula

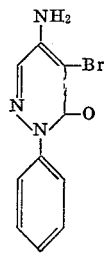

have a better herbicidal, particularly selective herbicidal, action than the individual active ingredients.

The particular advantage of these mixtures is that they have an excellent action on most dicotyledonous and monocotyledonous weeds and favorable selectivity on important crop plants, e.g., rice, Indian corn, barley, wheat and rye.

The ratio of components, a, b and c in the mixtures may be varied at will; those mixtures of the active ingredients are preferred which have the respective weight ratio a:b and a:c of 4:1 to 1:3.

The 3-isopropyl (or ethyl or methyl) - 2,1,3-benzothiadiazinone-(4)-2,2-dioxides and their salts (compound a) are known compounds, whose preparations are described in Ziedler et al. U.S. Pat. No. 3,708,277.

The N-[1- or 2-(3a,4,5,6,7,7a-hexahydro-4,7-methanoindanyl)]-N',N'-dimethylurea (compound b) and its preparation are disclosed in German Pat. No. 1,200,062, granted Sept. 2, 1965.

The 1-phenyl-4-amino-5-bromopyridazone-(6) is described in a publication of a manuscript of A. Fischer by I.I.R.B., vol. 3—no. 3—1968, as a reprint from the Journal Extrait de la Revue, Edit: 150, Beauduinstraat, Tirlemont, Belgium.

The herbicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C. and one or more than one functional group, e.g. the keto group, ether group, ester group or amide group, this group or these groups being attached as substituents to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredients, emulsifying or dispersing agent and possibly solvent.

Dusts may be prepared by mixing or grinding the active ingredients with a solid carrier, e.g. diatomaceous earth, talc, clay or fertilizers.

The mixtures may be used as such, or in admixture with insecticides, fungicides and fertilizers.

The following experiments demonstrate the application of the agents according to the invention.

EXAMPLE 1

On an agricultural site the plants barley (Hordeum vulgare), wheat (Triticum vulgare), rye (Secale cereale), annual bluegrass (Poa annua), lady's thumb (Polygonum persicaria), catchweed bedstraw (Galium aparine), slender foxtail (Alopercurus myosuroides) and wild oats (Avena fatua) are treated at a growth height of 3 to 20 cm. with 1.5 kg. per hectare of 3-isopropyl-2,1,3-benzothiadiazinone-(4)-2,2-dioxide (I), with 0.75 kg. per hectare of N-[1- or 2-(3a,4,5,6,7,7a-hexahydro-4,7-methanoindanyl)]-N',N'-dimethylurea (III), with 0.75 kg. per hectare of 1-phenyl-4-amino-5-bromopyridazone-(6) (IV), and with a mixture consisting of 1.5 kg. per hectare of I+0.75 kg. hectare of III+0.75 kg. per hectare of IV, all these amounts of the active ingredients each being dispersed in 500 liters of water per hectare. After 4 weeks, the action of the active ingredients and the mixture on the crop plants and broadleaved and grassy weeds is ascertained by determining their fresh weight (mean figures taken as relative values compared with untreated plants (=100)). It is ascertained that the fresh weight of cereals from the treated plots, and particularly in the case of the mixture of I+III+IV, is in some instances somewhat higher than in the case of the untreated plots, and the weight of the broadleaved and grassy weeds, in contrast to the untreated plots, decreases to such a great extent that only a few grams can be ascertained.

The results of the experiment are given in the following table:

| Active ingredient | Application rate | Fresh weight (relative) | | | | | | | |
|---|---|---|---|---|---|---|---|---|---|
| | | Hordeum vulgare | Triticum vulgare | Secal cereale | Poa annua | Polygonum persicaria | Galium aparine | Alopecurus myosuroides | Avena fatua |
| Untreated | | 100 | 100 | 100 | 100 | 100 | 100 | 100 | 100 |
| I | 1.5 | 101.2 | 105 | 100 | 75.4 | 5.4 | 40 | 89.5 | 95 |
| III | 0.75 | 98.5 | 100 | 96.5 | 25 | 59 | 89.4 | 20 | 25 |
| IV | 0.75 | 100 | 107.5 | 100 | 30.5 | 14.7 | 60 | 36.5 | 89.5 |
| I+III+IV | 1.5+0.75+0.75 | 101.0 | 100 | 102.2 | 12.1 | 2.6 | 24.4 | 14.7 | 10 |

EXAMPLE 2

In a greenhouse, the plants large crabgrass (*Digitaria sanguinalis*), barnyard grass (*Echinochloa crus-galli*), green foxtail (*Setaria viridis*), yellow nutsedge (*Cyperus esculentus*), Bermuda grass (*Cynodon dactylon*) and redroot pigweed (*Amaranthus retroflexus*) are treated at a growth height of 3 to 20 cm. with 1.5 kg. per hectare of 3-isopropyl-2,1,3-benzothiadiazinone-(4)-2,2 - dioxide (I), with 0.75 kg. per hectare of N-[1- or 2-(3a,4,5,6,7,7a-hexahydro-4,7-methanoindanyl)]-N',N' - dimethylurea (III), with 0.75 kg. per hectare of 1-phenyl-4-amino-5-bromopyridazone-(6)(IV), and with a mixture consisting of 1.5 kg. per hectare of I+0.75 kg. per hectare of III+0.75 kg. per hectare of IV, all these amounts of active ingredients each being dispersed in 500 liters of water per hectare. After 4 weeks, the action of the active ingredients and the mixture on the plants is ascertained by determining their fresh weight (mean figures taken as relative values compared with untreated plants (=100)). It is ascertained that the mixture of I+III+IV has, in comparison to the individual active ingredients, reduced the weight of the plants to a very considerable extent.

The results of the experiment are given in the following table:

| Active ingredient | Application rate | Fresh weight (relative) | | | | | |
|---|---|---|---|---|---|---|---|
| | | Digitaria sanguinalis | Echinochloa crusgalli | Setaria viridis | Cyperus esculentus | Cynodon dactylon | Amaranthus retroflexus |
| Untreated | | +100 | 100 | 100 | 100 | 100 | 100 |
| I | 1.5 | 89.5 | 88.9 | 85 | 19.8 | 100 | 99.8 |
| III | 0.75 | 20 | 5.4 | 25.5 | 80 | 25 | 80 |
| IV | 0.75 | 25.2 | 30 | 14.9 | 90 | 61.3 | 24.9 |
| I+III+IV | 1.5+0.75+0.75 | 3.7 | 1.6 | 2.3 | 9.4 | 0.4 | 5.8 |

I claim:

1. A herbicide consisting essentially of a herbicidally effective amount of a mixture of
(a) a compound having the formula

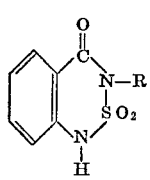

R denoting an isopropyl, ethyl or methyl radical or a salt thereof, and (b) a compound having the formula

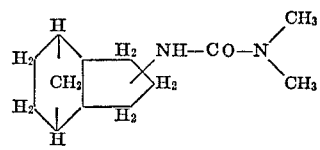

and (c) a compound having the formula

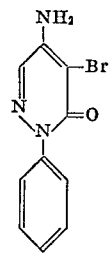

in a weight ratio of a:b and a:c of 4:1 to 1:3, said mixture being dispersed in a carrier.

2. A herbicide as claimed in claim 1 consisting essentially of a mixture of 3-isopropyl-2,1,3-benzothiadiazinone-(4)-2,2-dioxide or its salt, N-[1- or 2-(3a,4,5,6,7,7a-hexahydro-4,7-methanoindanyl)]-N',N'-dimethylurea and 1-phenyl-4-amino-5-bromopyridazone-(6).

3. A herbicide as claimed in claim 1 wherein the weight ratio of a:b:c is 2:1:1.

4. A process for controlling the growth of unwanted plants wherein the plants or the soil in which the growth of the plants is to be prevented are treated with a herbicidally effective amount of a mixture consisting essentially of
(a) a compound having the formula

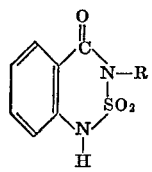

R denoting an isopropyl, ethyl or methyl radical or a salt thereof, (b) a compound having the formula

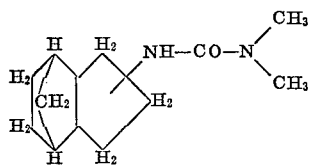

and (c) a compound having the formula

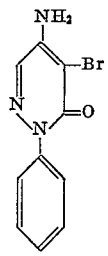

in a weight ratio of a:b and a:c of 4:1 to 1:3.

5. A process as claimed in claim 4 consisting essentially of a mixture of 3-isopropyl-2,1,3-benzothiadiazinone-(4)-2,2-dioxide or its salt, N-[1- or 2-(3a,4,5,6,7,7a-hexahydro-4,7-methanoindanyl)] - N',N' - dimethylurea and 1-phenyl-4-amino-5-bromopyridazone-(6).

6. A process as claimed in claim 4 wherein the weight ratio of a:b:c of 2:1:1.

References Cited
UNITED STATES PATENTS

| | | | |
|---|---|---|---|
| 3,708,277 | 1/1973 | Zeidler et al. | 71—91 |
| 3,385,690 | 5/1968 | Luckenbaugh | 71—119 X |
| 3,304,167 | 2/1967 | Buntin et al. | 71—119 |
| 3,210,353 | 10/1965 | Reicheneder et al. | 260—250 |

LEWIS GOTTS, Primary Examiner

C. L. MILLS, Assistant Examiner

U.S. Cl. X.R.

71—92, 119